United States Patent [19]

Kaczur et al.

[11] Patent Number: 5,167,777
[45] Date of Patent: Dec. 1, 1992

[54] PROCESS AND APPARATUS FOR THE REMOVAL OF OXYHALIDE SPECIES FROM AQUEOUS SOLUTIONS

[75] Inventors: Jerry J. Kaczur; David W. Cawlfield; Kenneth E. Woodard, all of Cleveland, Tenn.

[73] Assignee: Olin Corporation, Cheshire, Conn.

[21] Appl. No.: 605,898

[22] Filed: Oct. 30, 1990

[51] Int. Cl.$^5$ .............................................. C25B 1/02
[52] U.S. Cl. .................... 204/129; 204/130; 204/149; 204/152; 210/748
[58] Field of Search .............. 204/129, 149, 152, 130; 210/748

[56] References Cited

U.S. PATENT DOCUMENTS

| | | | |
|---|---|---|---|
| 2,717,237 | 9/1955 | Rempel | 204/101 |
| 3,823,225 | 7/1974 | Sprague | 423/478 |
| 4,444,631 | 4/1984 | Bommaraju et al. | 204/128 |
| 4,456,510 | 6/1984 | Murakami et al. | 204/101 |
| 4,465,533 | 8/1984 | Covitch | 204/282 |
| 4,627,899 | 12/1986 | Smith et al. | 204/112 |
| 4,731,169 | 3/1988 | Lipsztajn | 204/130 |

OTHER PUBLICATIONS

Article Journal of Electroanal. Chem. Interfacial Electrochem., vol. 64, pp. 252–254, 1975; Journal Electroanal Chem., vol. 163, pp. 237–255, 1984; and Journal Electroanal. Chem., vol. 163, pp. 243–255, 1985.
Article entitled "Kinetics of the Reduction of Chlorite Ion" by She-Huang Wu and Jiann-Kuo-Wu in the TATUNG Journal, vol. XVI, pp. 253–256, Nov. 1986.

Primary Examiner—John Niebling
Assistant Examiner—Kathryn Gorgos
Attorney, Agent, or Firm—Ralph D'Alessandro

[57] ABSTRACT

A process for electrochemically treating an aqueous solution containing inorganic oxyhalide species is disclosed in which the aqueous solution is fed into the catholyte compartment of an electrochemical reduction cell using a high surface area cathode separated from an anolyte compartment to electrochemically reduce substantially all of the oxyhalide species to halide ions and produce a purified water product.

30 Claims, 1 Drawing Sheet

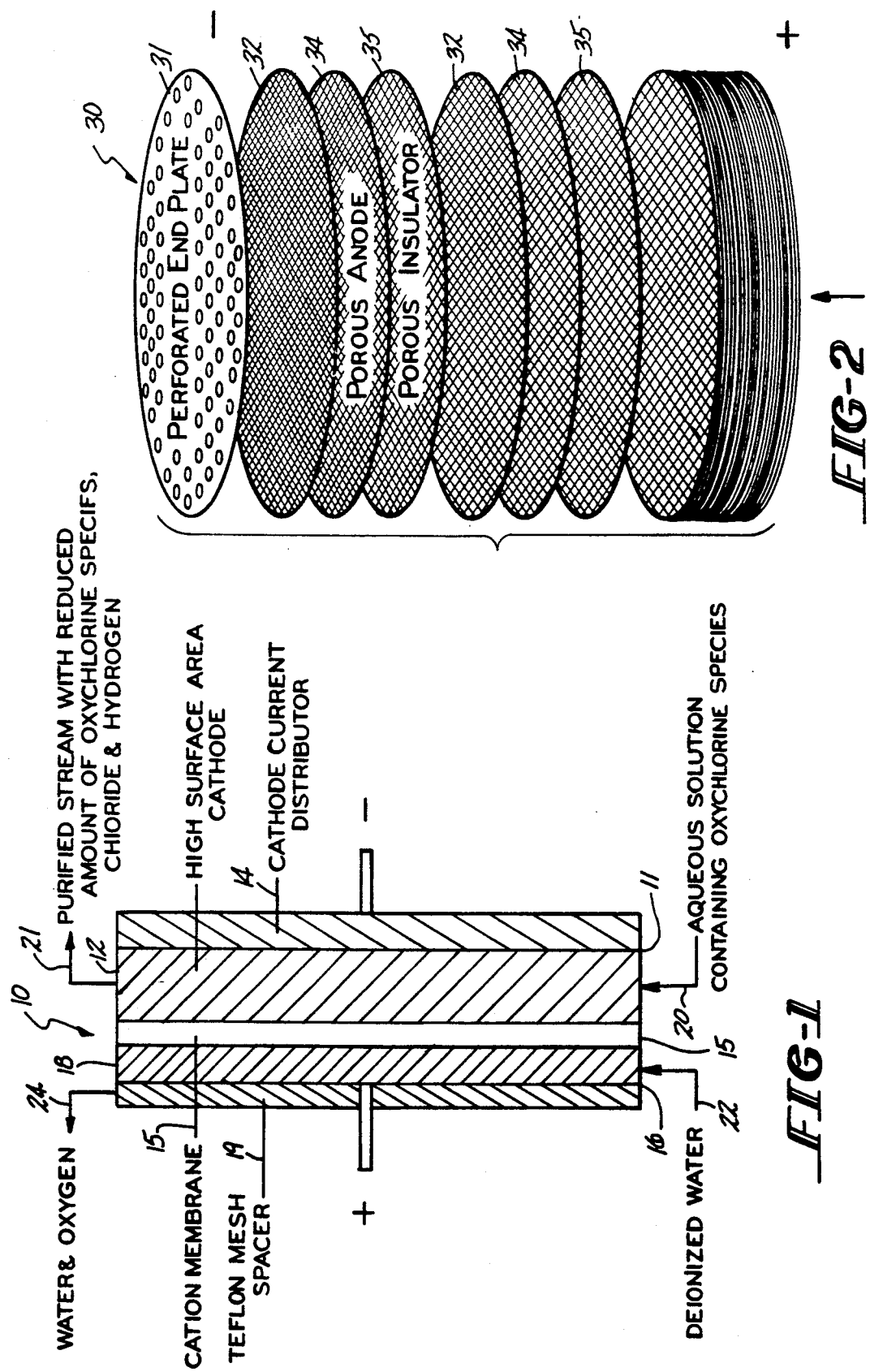

PROCESS AND APPARATUS FOR THE REMOVAL OF OXYHALIDE SPECIES FROM AQUEOUS SOLUTIONS

BACKGROUND OF THE INVENTION

This invention relates generally to the production of purified aqueous solutions. More particularly, the present invention relates to the electrochemical reduction of oxychlorine species in aqueous solutions to remove such species by reducing them to environmentally safe chloride ions. The process and the apparatus employing the process are suitable for both waste water and potable water treatment. The electrochemical reduction occurs on a high surface area cathode structure. Both dilute and concentrated solutions of oxychlorine species can be reduced to environmentally safe chlorides by the process and apparatus of this invention.

Chlorine dioxide is widely used as an oxidizer and disinfectant for taste and odor control in drinking water and as a bleaching agent in the production of pulp and paper. It is also used for the oxidation of trihalomethane precursors in drinking water. Most of the chlorine dioxide generators used in drinking water treatment employ a 95-98% efficient chemical reaction between chlorine gas and sodium chlorite. The unreacted sodium chlorite remains as an oxyhalide that is increasingly undesirable both toxicologically and environmentally in drinking water.

In the commercial environment of pulp and paper mills, large volumes of chlorine dioxide are generated from the combined reaction of a chlorate salt, acid, and a reducing agent. Alkali metal or alkaline earth chlorate salts are employed with the typical being sodium chlorate. Common acids used in the process are sulfuric or hydrochloric. Representative reducing agents used are sodium chloride, methanol or sulfur dioxide. These reagents are used in various combinations depending upon the specific chlorine dioxide process employed. The aqueous flow streams from these processes all have the potential to contain significant amounts of unreacted chlorate, as well as chlorite and chlorate by-products produced from pulp and paper bleaching processes.

In drinking water applications, the by-products of chlorine dioxide treatment pose a major problem. These by-products are chlorite and chlorate. Chlorite is the principal by-product produced from the reaction of trihalomethane precursors and chlorine dioxide. Chlorate, once formed either from the chlorine dioxide generator or from by-product reactions, is not easily removed chemically. Previous approaches attempted to remove chlorite from drinking water by using sulfur-based reducing agents, such as sulfur dioxide, sodium bisulfite, and sodium sulfite. Unfortunately, these reducing agents produce chlorate as a major by-product of complex side reactions with oxygen in water. Another approach has used sodium thiosulfate as a reducing agent which does not produce significant amounts of by-product chlorate. Thiosulfate, however, suffers from safety considerations because of unwanted sulfur-oxygen by-products produced in the water.

These and other problems are solved in the process and by the apparatus employing the process of the present invention by removing both chlorite and chlorate from aqueous solutions, as well as other oxychlorine species, from aqueous solutions by the use an electrochemical reduction process.

SUMMARY OF THE INVENTION

It is an object of the present invention to provide a process to remove oxychlorine species, including chlorites and chlorates, from aqueous solutions as a part of a major water treatment process for waste water and potable water.

It is another object of the present invention to provide a process and apparatus for employing the process to treat dilute aqueous solutions by electrochemically reducing oxychlorine species therein and to remove them from the solution by reducing the oxychlorine species to environmentally safe chloride ions.

It is a feature of the present invention that the electrochemical reduction process can remove trace transition metal ions from the aqueous solution by depositing them onto the cathode surface.

It is another feature of the present invention that the electrochemical reduction process can be combined as a part of the method of treating drinking water in combination with the chlorine dioxide oxidizing and disinfecting treatment system.

It is another feature of the present invention that a high surface area cathode is employed in the process and the apparatus employing the process of the present invention.

It is yet another feature of the present invention that the electrochemical reduction process operates at a high efficiency wherein the sum of the current efficiency and the removal efficiency of the oxychlorine species is greater than about 50%.

It is an advantage of the present invention that the electrochemical reduction process can be used in an electrochemical cell to convert both low or high concentrations of oxychlorine species in aqueous solutions to environmentally safe chloride ions.

It is another advantage of the present invention that chlorine dioxide may be used in combination with the instant process as an oxidizer for the destruction of trihalomethane precursors in drinking water treatment.

It is still another advantage of the present invention that the electrochemical reduction process allows the use of more efficient levels of oxidizing disinfectants, such as chlorine dioxide and chlorine, without leaving traces of their by-products in potable water treatment.

It is yet another advantage of the present invention that waste water effluents containing high levels of oxychlorine species, such as chlorate from bleaching applications, can be substantially reduced to environmentally safe chloride ions.

These and other objects, features and advantages are obtained in the process and the apparatus employing the process of the present invention by feeding an aqueous solution to be electrochemically reduced in a catholyte compartment of an electrochemical cell having a separator between the catholyte compartment and the anolyte compartment and using a high surface area cathode to electrochemically reduce substantially all of the oxyhalide species in the aqueous solution to halide ions.

BRIEF DESCRIPTION OF THE DRAWINGS

These and other objects, features and advantages of the invention will become apparent upon consideration of the following detailed disclosure of the invention especially when is taken in conjunction with the accompanying drawings wherein:

FIG. 1 is a side elevational view of an electrochemical reduction cell; and

FIG. 2 is an exploded view of a bipolar flow-through electrochemical cell stack.

DETAILED DESCRIPTION OF THE PREFERRED EMBODIMENT

FIG. 1 shows an electrochemical cell that can be employed to reduce the concentration of oxychlorine species in aqueous solutions to environmentally safe chloride ions. The cell is indicated generally by the numeral 10. Cell 10 comprises a catholyte compartment 11 and a anolyte compartment 16 separated by a separator 15. The separator 15 can be a diaphragm if the anode reaction doesn't generate chlorine or other undesirable products. It must be kept separate from the catholyte products. Alternately, and more preferably, the separator 15 is a permselective cation exchange membrane. Suitable cation exchange membranes are those sold under the NAFION ® trademark by E. I. DuPont de Nemours and Company, the membranes sold under the FLEMION ® trademark produced by Asahi-Glass Company. Hydrocarbon based membranes can also be used depending on their suitability at the cell's operating parameters, such as temperature.

The catholyte compartment 11 contains a high surface area cathode 12 that has a specific surface area of greater than about 50 cm$^2$/cm$^3$ and is made from a high hydrogen overvoltage material. A cathode current distributor 14 is provided to distribute current to the cathode. The cathode current distributor 14 preferably is a solid distributor backplate but may also be perforated. The high surface area cathode 12, the current distributor plate 14 and the separator or cation exchange membrane 15 are mounted or assembled in direct contact in a zero-gap spacing arrangement.

The anolyte compartment 16 contains an anode material 18 that may be of expanded titanium metal with an oxygen catalyst coating. A spacer 19 is provided, functioning as a gas disengagement device, as well as providing physical spacing of the anode 18 from the separator 15 when the separator is an ion exchange membrane. A catholyte feed line 20 is diagrammatically illustrated as feeding aqueous solution into the bottom of the cell 10, while a catholyte compartment outlet line 21 is shown to remove the product of the reduction of the oxychlorine species. Where anolyte is used, an anolyte feed line 22 is provided to feed either deionized water, softened water or non-oxidizing acids to the anolyte compartment 16. The cell 10 can be operated in an anolyteless configuration when using a microporous diaphragm or in low current density operation with a water permeable separator.

Where an anolyte solution is provided, the solution flows through the anolyte compartment 16 to supply water for the oxidation of water at the electrode surface according to an oxidation reaction of:

$$2H_2O \rightarrow O_2 + 4H^+ + 4e^-$$

Oxygen gas is externally disengaged in an anolyte gas disengager (not shown). The aqueous solution being reduced is fed in through the catholyte feed line 20 to the high surface area cathode 12 where the oxychlorine species are electrochemically reduced on the cathode surface through various lower chlorine valence reduced chlorine-oxygen intermediates, finally ending as chloride ions. The reduced solution and any by-product halogen produced then exits the cell through the catholyte compartment outlet line 21 to flow to an external catholyte disengager (not shown) to separate hydrogen gas from the water stream. Hydrogen gas can be produced by the competing water reduction reaction that can occur at the cathode surface and reduce the efficiency of the reduction as follows:

$$2H_2O + 2e^- \rightarrow H_2 + 2OH^-.$$

The electrochemical reduction efficiency of the high surface area cathode is dependent upon a number of variables, such as the concentration of the oxychlorine species, the flow rate of the aqueous solution through the high surface area cathode structure, the number of electrons required for the reduction of each oxychlorine species, the residence time of the solution in the cathode, the high surface area cathode density, the cathode specific surface area, the hydrogen overvoltage and the electrochemical characteristics of the cathode material employed. One advantage of the present invention is that the electrochemical reduction is done at high efficiency since the sum of the current efficiency and the removal efficiency of the oxychlorine species is greater than about 50%. The current efficiency is defined as the Faraday equivalent of the electrochemical reduction of the oxychlorine species reduced to chloride ions divided by the number of Faradays of electricity used.

The oxychlorine species that can be reduced can include chlorine dioxide, chlorate, perchlorate, hypochlorous acid, hypochlorite, chlorine and chlorites. The net reduction reactions and the standard potentials for these reactions for these oxychlorine species in acid solutions are as follows:

| | | |
|---|---|---|
| $ClO_2^- + 4H^+ + 4e^-$ | $\rightarrow$ | $Cl^- + 2H_2O$ |
| $E_o = -1.599$ Volts | | |
| $ClO_3^- + 6H^+ + 6e^-$ | $\rightarrow$ | $Cl^- + 3H_2O$ |
| $E_o = -1.451$ Volts | | |
| $ClO_4^- + 8H^+ + 8e^-$ | $\rightarrow$ | $Cl^- + 4H_2O$ |
| $E_o = -1.389$ Volts | | |
| $HClO + H^+ + 2e^-$ | $\rightarrow$ | $Cl^- + H_2O$ |
| $E_o = -1.494$ Volts | | |
| $ClO^- + 2H^+ + 2e^-$ | $\rightarrow$ | $Cl^- + 2H_2O$ |
| $E_o = -1.715$ Volts | | |
| $ClO_2 + 4H^+ + 5e^-$ | $\rightarrow$ | $Cl^- + 2H_2O$ |
| $E_o = -1.511$ Volts | | |

Although only chloride and oxychlorine species reduction are described in the above equations, it is to be understood that this is equally well effective for any oxyhalide species reduction. The oxyhalide species can be a halide selected from the group consisting of bromine, fluorine and iodine, as well as chlorine.

An additional benefit from the use of the present electrochemical reduction process is that trace transition metal ions may be removed from the aqueous solution by being deposited onto the cathode surface. Typical metals that can be so removed include iron, nickel, zinc. These deposited metallic ions can be removed periodically by acid treatment of the cathode in situ or by replacing the cathode after a predetermined number of hours of operation. The periodic acid treatment of the cathode can help remove any alkaline earth deposits that may precipitate or form on the surface, such as calcium hydroxide or magnesium hydroxide.

The aqueous solution fed into the cell through catholyte feed line 20 may be either acidic or alkaline and the pH may be adjusted to optimize the desired reduction.

The normal operating pH range can be from about 2 to about 13, but more preferably is from about 3 to about 11. For maximum reduction of chlorate ions in the aqueous solution, a feed pH of less than about 7 and preferably less than about 3 is desirable. However, chlorite reduction can be accomplished at a wide range of aqueous solution pH's from about 1 to about 12 or 13.

The temperature of the cell 10 in operation can vary from about 0° to about 120° C., with a preferred temperature range being from about 5° to about 95° C. The aqueous solution feed stream can be preheated to increase the operating temperature, if necessary. The cell operating current density can be from about 0.002 to about 10 $KA/M^2$, with a more preferred range being from about 0.05 to about 3 $KA/M^2$. The potential heat build-up within the cell to above the operating temperature of the cell components caused by electrical resistance limits the cell operating current density. The limiting factors affecting the current efficiency are the concentration of the oxychlorine species that is to be reduced and the mass flow rate through the high surface area cathode. The average velocity of the flow of the aqueous solution through the catholyte compartment is in the range of 0.01 to about 5.0 feet per minute, or about 0.3 to about 152 centimeters per second. The electrochemical reduction process is also adaptable for processing very slow flows on the order of grams per minute to flows greater than about 100 to about 1,000 gallons per minute.

Where an anolyte is utilized, deionized water is preferred, especially when the anode is in direct physical contact with the membrane. Other suitable anolytes that are appropriate include non-oxidizing acids in the range of about 0.5 to about 40% by weight solutions of, for example, sulfuric acid, perchloric acid and phosphoric acid. Softened water may be also be used as the anolyte, but small amounts of chloride may produce small amounts of chlorine in the output anolyte stream. Any sodium ions in the anolyte can be transferred to the catholyte, thereby forming sodium hydroxide in the solution product which might be an advantage for acid streams where there is a need to increase the pH.

A thin protective spacer material such as anode spacer 19 may be employed made from a chemically resistant plastic mesh to permit the use of expanded metal anodes. The spacer 19 can also be used to allow for gas disengagement behind the anode. Suitable materials include corrosion resistant plastics such as polyvinylidene fluoride, polyethylene, polypropylene and fluoropolymers, such as polytetrafluoroethylene.

The anode can be coated with an oxygen evolving catalytic coating such as an iridium oxide based coating on titanium, or any suitable valve or oxide forming metal that is stable as an electrode. Other suitable anode coatings can include platinum and other precious metal or oxide coatings. Perovskite based coatings made from transition metal type oxides prepared from cobalt, iron, etc. are also suitable, as is a conductive titanium oxide composition sold under the trade name of Ebonex ®.

The cathode current distributor 14 may be formed of any smooth, solid stainless steel type of material, such as types 304, 316, 310 etc. A perforated sheet could also be employed where there are no significant feed solution flows bypassing the high surface area cathode structure.

The high surface area cathode may be made from any number of suitable materials, such as graphite, carbon, nickel, stainless steel, tantalum, tin, titanium, zirconium, iron, copper, other transition metals and alloys thereof. Precious metals, such as gold and silver, preferably in the form of coatings, could also be used. The electrode material preferably should be of the non-sacrificial type. A sacrificial type, such as an iron based material in the form of steel wool, could be used but would suffer from the disadvantage of corroding during periods of non-use or non-operation. Another sacrificial type of material is titanium, which suffers from the disadvantage of hydriding during operation. The high surface area cathode should preferably be formed of a high hydrogen overvoltage material. Materials with high hydrogen overvoltages have increased current efficiency and promote the desired reduction of the oxychlorine species to chloride. The cathode can be coated or plated with oxides, such as ruthenium or other precious metal oxides, to enhance or catalyze the electroreductive conversion of the oxychlorine species to chloride ions. Although the Examples that follow utilized a platinum plated titanium cathode current distributor, it is expected that a material having a higher hydrogen overvoltage material, such as stainless steel, would give a higher efficiency performance.

The cathode surface area is especially important with one pass or single flow through processing. The specific surface area of the cathode structure can range from about 5 $cm^2/cm^3$ to about 2000 $cm^2/cm^3$, and more preferably, from about 10 $cm^2/cm^3$ to about 1000 $cm^2/cm^3$. The high surface area density can range from about 0.5% to about 90% or more preferably from about 1% to about 80%, with an optimum range being from about 2 about 50%. The lower the density of the high surface area material, the lower is the flow pressure drop of the stream through the cathode structure.

The high surface area cathode material can be formed from any of the above-named materials in the form of felts, matted fibers, semi-sintered powders, woven cloths, foam structures or multiple layers of thin expanded or perforated sheets. The high surface area cathode can also be constructed in a gradient type of structure, that is using various fiber diameters and densities in various sections of the cathode structure to improve performance or reduce flow pressure drop through the structure. The gradient structure can also be used to enhance the current distribution through the structure. The high surface area cathode can be sintered to the cathode current distributor backplate as a unit. It is preferable to have a removable structure for ease of cathode 12 structure maintenance and replacement.

Cell 10 can be arranged also in a bipolar configuration or alternately with internal electrolyte distribution, especially where the water being treated has low conductivity. Another configuration, best seen in FIG. 2, is possible where the aqueous solution being treated may flow alternately through high surface area cathodes and low surface area anodes so that the oxyhalide species are reduced while oxygen is liberated at the anode. In this instance a cation exchange membrane is not required, but a non-conductive porous separator insulator 35 is used between the porous anode 34 and the porous cathode 32. The cell 30 has a perforated end plate 31 and is stacked in a bipolar flow-through configuration with a direction of flow being indicated by the arrow. Optimum operation of a bipolar cell of this configuration is pH dependent. Operation in the pH neutral range with anode surfaces that are catalyzed for oxygen and evolution will maximize oxygen formation and minimize reoxidation of the chloride ions.

Another alternative cell design (not shown) may be employed for low current density and high flow rate operations and is especially suitable for potable water treatment. In this design alternating layers of anode, membrane, porous cathode, cathode backplate and a plastic insulator are wrapped around an inner core. Electrical connections can be made at the core or at the outside edge of the layered roll, or both. In this design, the feed solution flows only through cathode compartment and the anode operates by oxidizing water diffused through the membrane. This design presents the advantage of preventing solution contact with the anode and re-oxidation of the reduced chloride ions to chlorine or chlorate.

In order to exemplify the results achieved, the following examples are provided without any intent to limit the scope of the instant invention to the discussion therein.

EXAMPLE I

An electrochemical cell was constructed and assembled similar to that shown in FIG. 1 consisting of an anode compartment and a cathode compartment separated by a DuPont NAFION ® 117 cation exchange membrane. The anode was an expanded titanium metal with a thin platinum electroplated coating with a titanium welded post mounted in the anode compartment in direct contact against the membrane. An expanded plastic spacer constructed of TEFLON ® polytetrafluoroethylene having a thickness of about 0.0625 inches (0.1588 cm) was used to position the anode against the membrane and to provide an anolyte liquid/gas disengagement zone behind the anode. The anode was about 3 inches (7.62 cm) by about 12 inches (30.48 cm) with a projected area of about 36 square inches (0.0232 M$^2$).

A solid titanium platinum plated cathode current distributor plate with a welded titanium bolt connection was employed and had a thickness of about 0.030 inches (0.762 cm). The cathode was about 3 inches (7.62 cm) by about 12 inches (30.48 cm) with a projected area of 36 sq. in. (0.0232 M$^2$). Two layers of 0.125 inch (0.13575 cm) graphite felt supplied by National Electric Carbon Company were positioned directly in contact against the cation exchange membrane and the cathode current distributor plate. The two layers of felt were compressed to the depth of the cathode compartment recess, which is approximately ⅛ of an inch (0.3175 cm) when the cell is assembled. The graphite felt layers had a specific surface area of about 300 cm$^2$/cm$^3$.

Deionized water was metered through a rotameter into the anode compartment at a rate of about 2 milliliters per minute. Various oxychlorine species containing aqueous solutions were metered at different flow rates into the bottom of the cathode compartment and flowed upwardly to the thickness of the high surface area graphite felt and perpendicular to the applied current. The flow rate and the applied current were varied in the tests that followed. The oxychlorine species concentrations were analyzed in the feed solutions and in the product output from the electrochemical reduction cell.

The attached Table I gives the results of 3 tests demonstrating the direct reduction of dilute sodium chlorite and deionized water being processed in a single flow through arrangement.

Test set 1 shows the results of processing a 100 ppm sodium chlorite solution at about a 2 ampere setting with a constant mass flow rate of about 53 grams per minute. Sodium chlorite in the product was reduced to about 51 to about 56 ppm at about 2.0 amperes with the current efficiency of about 8.4 to about 9.1%. At a reduced current of about 1.0 amperes, the sodium chlorite concentration slightly increased to about 53 to about 61 ppm with a higher current efficiency of 39 to about 46.6%.

Test set 2 in Table I employed a slightly higher concentration of about 107 ppm of sodium chlorite and deionized water in a similar one pass flow through reduction treatment. Both the flow rate and current were varied with the results as shown in Table I. The lower flow rate of about 27.6 grams per minute and a lower amperage of about 1.0 amps yielded a 58% reduction in chlorite and current efficiency of about 12.2%. The highest chlorite reduction occurred at 27.6 grams per minute flow rate at 4 amps, yielding about a 73.9 to 76.3% chlorite product solution reduction to about 25 to about 28 ppm.

Test set 3 in Table I used the product solution obtained from Test set 2 and had it recycled with about 51 ppm sodium chlorite. A chlorite reduction of about 56.1 to about 60%, effectively about 20-22 ppm, was obtained at a solution flow rate of about 53 grams per minute and 2 amps.

The attached Table II shows the test results employing a higher concentration of dilute sodium chlorite dissolved in deionized water processed multiple times through the cell at a single pass flow arrangement. Test set 1 used a feed concentration of about 1078 ppm sodium chloride that was passed through the cell at a flow rate of about 55 grams per minute and at a current of about 4.0 amperes. In the first pass the chlorite in the product stream was reduced by about 34.7% to 704 ppm. After the second pass through the cell, the chlorite was reduced by a total of 53.7% from the original concentration to about 499 ppm. In the third pass, the concentration was reduced by a total of 66.3% to about 363 ppm, while in the fourth pass the concentration was reduced by a total of 77.9% to about 238 ppm. The cell current efficiency ranged between about 12.2 and 36.6% under these operating conditions.

Table 3 shows the test results of two test sets demonstrating the direct reduction of dilute chlorine dioxide solution in tap water. The water contained about 6.7 ppm chlorine dioxide and about 2 ppm of chlorine that was processed through the cell on a single pass. The Test set 1 analysis was reported as a total titration as NaClO$_2$. The results with the chlorine dioxide/chlorine tap water solution showed about an 80% total reduction as sodium chlorine dioxide at about 2.00 amperes of a flow rate of about 53 grams per minute. The chlorine dioxide was reduced from about 11.3 ppm to about 2.2 ppm.

In the second test set the feed from test set 1 was diluted by about half so that the chlorine dioxide was reduced from about 6.6 ppm to about 2.2 ppm at a flow rate of about 53 grams per minute and a current of about 0.5 amps.

TABLE I

ELECTROCHEMICAL REDUCTION OF AQUEOUS DILUTE SOLUTIONS OF CHLORITE
IN A SINGLE PASS ELECTROCHEMICAL CELL
CATHODE: Graphite Felt

| TIME | FEED FLOW-RATE (gm/min) | CELL OPERATION AMPS | CELL OPERATION VOLTS | PRODUCT pH | PRODUCT SOLUTION TITRATION ml | PRODUCT SOLUTION TITRATION gm Sample | PRODUCT SOLUTION COMPOSITION gm/l as NaClO2 | PRODUCT SOLUTION COMPOSITION ppm as NaClO2 | CELL CURRENT EFFICIENCY % | NaClO2 REDUCTION % |
|---|---|---|---|---|---|---|---|---|---|---|
| \multicolumn{11}{c}{TEST SET #1: Sodium Chlorite in Deionized Water Solution - Dilute Solution} |
| FEED COMPOSITION → | | | | 8.50 | 1.80 | 40.816 | 0.100 | 100 | | |
| 1:15 | 53.0 | 2.00 | ← Cell Start-up | | | | | | | |
| 1:25 | 53.0 | 2.00 | 2.83 | 9.72 | 1.10 | 47.955 | 0.052 | 52 | 9.1 | 48.0 |
| 1:35 | 53.0 | 2.00 | 2.81 | 9.74 | 0.90 | 40.027 | 0.051 | 51 | 9.2 | 49.0 |
| 1:40 | 53.0 | 2.00 | 2.79 | 9.66 | 1.00 | 40.645 | 0.056 | 56 | 8.3 | 44.2 |
| 1:45 | 53.0 | 2.00 | 2.79 | 9.62 | 1.00 | 40.908 | 0.055 | 55 | 8.4 | 44.6 |
| 1:50 | 53.0 | 1.00 | ← Change in Current | | | | | | | |
| 1:55 | 53.0 | 1.00 | 2.55 | 8.98 | 1.10 | 41.226 | 0.061 | 61 | 14.9 | 39.5 |
| 2:00 | 53.0 | 1.00 | 2.55 | 9.01 | 1.00 | 40.339 | 0.056 | 56 | 16.5 | 43.8 |
| 2:10 | 53.0 | 1.00 | 2.55 | 9.10 | 1.00 | 40.485 | 0.056 | 56 | 16.6 | 44.0 |
| 2:15 | 53.0 | 1.00 | 2.55 | 9.10 | 0.95 | 40.340 | 0.053 | 53 | 17.6 | 46.6 |
| \multicolumn{11}{c}{TEST SET #2: Sodium Chlorite in Deionized Water Solution - Dilute Solution} |
| FEED COMPOSITION → | | | | 8.50 | 1.90 | 40.421 | 0.107 | 107 | | |
| 2:30 | 27.6 | 1.00 | ← Cell Start-up on New Feed | | | | | | | |
| 2:35 | 27.6 | 1.00 | 2.63 | 9.70 | 0.80 | 40.777 | 0.045 | 45 | 12.2 | 58.3 |
| 2:40 | 27.6 | 1.00 | 2.63 | 9.66 | 0.80 | 40.748 | 0.045 | 45 | 12.2 | 58.2 |
| 2:40 | 27.6 | 2.00 | ← Change in Current | | | | | | | |
| 2:45 | 27.6 | 2.00 | 2.83 | 10.12 | 0.70 | 41.488 | 0.038 | 38 | 6.7 | 64.1 |
| 3:00 | 27.6 | 2.00 | 2.81 | 9.98 | 0.70 | 41.021 | 0.039 | 39 | 6.7 | 63.7 |
| 3:05 | 27.6 | 4.00 | ← Change in Current | | | | | | | |
| 3:10 | 27.6 | 4.00 | 3.17 | 10.35 | 0.45 | 40.371 | 0.025 | 25 | 4.0 | 76.3 |
| 3:15 | 27.6 | 4.00 | 3.12 | 10.27 | 0.50 | 40.732 | 0.028 | 28 | 3.9 | 73.9 |
| 3:15 | 53.0 | | ← Change in Flowrate | | | | | | | |
| 3:25 | 53.0 | 4.00 | 3.12 | 9.86 | 0.90 | 40.346 | 0.051 | 51 | 5.3 | 52.5 |
| 3:30 | 53.0 | 4.00 | 3.12 | 9.83 | 0.90 | 41.906 | 0.049 | 49 | 5.5 | 54.3 |
| 3:30 | 53.0 | 6.00 | ← Change in Current | | | | | | | |
| 3:35 | 53.0 | 6.00 | 3.33 | 10.03 | 0.85 | 41.542 | 0.046 | 46 | 3.8 | 56.5 |
| 3:40 | 53.0 | 6.00 | 3.33 | 9.87 | 0.85 | 41.544 | 0.046 | 46 | 3.8 | 56.5 |
| \multicolumn{11}{c}{TEST SET #3: Product Solution from Test Set #2 Used as Feed} |
| FEED COMPOSITION → | | | | 9.75 | 0.90 | 40.437 | 0.051 | 51 | | |
| 3:50 | 53.0 | 2.00 | ← Cell Start-up on New Feed | | | | | | | |
| 4:00 | 53.0 | 2.00 | 2.75 | 9.14 | 0.40 | 40.947 | 0.022 | 22 | 5.3 | 56.1 |
| 4:10 | 53.0 | 2.00 | 2.75 | 9.30 | 0.40 | 44.889 | 0.020 | 20 | 5.7 | 60.0 |

TABLE II

ELECTROCHEMICAL REDUCTION OF AQUEOUS DILUTE SOLUTIONS OF CHLORITE
IN A SINGLE PASS ELECTROCHEMICAL CELL
— RECYCLE TESTS —
CATHODE: Graphite Felt

| | FEED FLOW-RATE (gm/min) | CELL OPERATION AMPS | CELL OPERATION VOLTS | PRODUCT pH | PRODUCT SOLUTION TITRATION ml | PRODUCT SOLUTION TITRATION gm Sample | PRODUCT SOLUTION COMPOSITION gm/l as NaClO2 | PRODUCT SOLUTION COMPOSITION ppm as NaClO2 | CELL CURRENT EFFICIENCY % | NaClO2 % REDUCTION PER PASS | NaClO2 % REDUCTION CUMULATIVE |
|---|---|---|---|---|---|---|---|---|---|---|---|
| \multicolumn{12}{c}{TEST SET #1: Sodium Chlorite in Deionized Water Solution - Dilute Solution} |
| FEED COMPOSITION → | | | — | 4.75 | 10.000 | 1.078 | 1078 | | | | |
| | 55.0 | 4.00 | ← Cell Start-up | | | | | | | | |
| 1st PASS | 55.0 | 4.00 | 2.60 | — | 3.10 | 10.000 | 0.704 | 704 | 20.0 | 34.7 | 34.7 |
| → | 1st Pass Solution Product used as Feed through Cell Again | | | | | | | | | | |
| 2nd PASS | 55.0 | 4.00 | 2.60 | — | 2.20 | 10.000 | 0.499 | 499 | 20.0 | 29.0 | 66.3 |
| → | 2nd Pass Solution Product used as Feed through Cell Again | | | | | | | | | | |
| 3rd PASS | 55.0 | 4.00 | 2.60 | — | 1.60 | 10.000 | 0.363 | 363 | 13.3 | 27.3 | 66.3 |
| → | 3rd Pass Solution Product used as Feed through Cell Again | | | | | | | | | | |
| 4th PASS | 55.0 | 4.00 | 2.60 | — | 1.05 | 10.000 | 0.238 | 238 | 12.2 | 34.4 | 77.9 |

TABLE III

ELECTROCHEMICAL REDUCTION OF AQUEOUS DILUTE SOLUTIONS OF CHLORINE DIOXIDE
IN A SINGLE PASS ELECTROCHEMICAL CELL
CATHODE: Graphite Felt

| TIME | FEED FLOW-RATE (gm/min) | CELL OPERATION AMPS | CELL OPERATION VOLTS | PRODUCT pH | PRODUCT SOLUTION TITRATION ml | PRODUCT SOLUTION TITRATION gm Sample | PRODUCT SOLUTION COMPOSITION gm/l as NaClO2 | PRODUCT SOLUTION COMPOSITION ppm as NaClO2 | CELL CURRENT EFFICIENCY % | NaClO2 REDUCTION % |
|---|---|---|---|---|---|---|---|---|---|---|

TEST SET #1: Chlorine Dioxide in Tap Water Solution - Dilute Solution

TABLE III-continued

ELECTROCHEMICAL REDUCTION OF AQUEOUS DILUTE SOLUTIONS OF CHLORINE DIOXIDE IN A SINGLE PASS ELECTROCHEMICAL CELL
CATHODE: Graphite Felt

| TIME | FEED FLOW-RATE (gm/min) | CELL OPERATION AMPS | CELL OPERATION VOLTS | PRODUCT pH | PRODUCT SOLUTION TITRATION ml | PRODUCT SOLUTION TITRATION gm Sample | PRODUCT SOLUTION COMPOSITION gm/l as NaClO2 | PRODUCT SOLUTION COMPOSITION ppm as NaClO2 | CELL CURRENT EFFICIENCY % | NaClO2 REDUCTION % |
|---|---|---|---|---|---|---|---|---|---|---|
| | | | | ClO2 concentration is 0.0067 gpl or 6.7 ppm | | | | | | |
| FEED COMPOSITION → | | | | 6.22 | 0.40 | 80.552 | 0.0113 | 11.3 | | |
| 4:15 | 53.0 | 2.00 | ← Cell Start-up | | | | | | | |
| 4:25 | 53.0 | 2.00 | 2.72 | 6.78 | 0.08 | 80.608 | 0.0023 | 2.3 | 1.7 | 80.0 |
| 4:30 | 53.0 | 2.00 | 2.72 | 6.65 | 0.08 | 80.957 | 0.0022 | 2.2 | 1.7 | 80.1 |
| 4:35 | 53.0 | 2.00 | 2.72 | 6.50 | 0.08 | 81.137 | 0.0022 | 2.2 | 1.7 | 80.1 |
| 4:35 | 53.0 | 0.50 | ← Change in Current | | | | | | | |
| 4:40 | 53.0 | 0.50 | 2.39 | 6.30 | 0.12 | 80.623 | 0.0034 | 3.4 | 6.0 | 70.0 |
| 4:45 | 53.0 | 0.50 | 2.39 | 5.96 | 0.08 | 81.044 | 0.0022 | 2.2 | 6.8 | 80.1 |
| 4:50 | 53.0 | 0.50 | 2.39 | 5.81 | 0.08 | 83.021 | 0.0022 | 2.2 | 6.8 | 80.6 |
| TEST SET #2: Chlorine Dioxide in Tap Water Solution - Feed from Test Set #4 Diluted by ¼ | | | | | | | | | | |
| FEED COMPOSITION → | | | | 6.74 | 0.24 | 83.143 | 0.0066 | 6.6 | | |
| 4:50 | 53.0 | 0.50 | ← Cell Start-up | | | | | | | |
| 5:00 | 53.0 | 0.50 | 2.40 | 6.35 | 0.08 | 80.181 | 0.0023 | 2.3 | 6.8 | 65.4 |
| 5:10 | 53.0 | 0.50 | 2.40 | 6.32 | 0.08 | 81.182 | 0.0022 | 2.2 | 6.8 | 65.9 |
| 5:10 | 53.0 | 2.00 | ← Change in Current | | | | | | | |
| 5:20 | 53.0 | 2.00 | 2.79 | 7.20 | 0.08 | 82.051 | 0.0022 | 2.2 | 1.7 | 66.2 |
| 5:25 | 53.0 | 2.00 | 2.80 | 7.25 | 0.08 | 81.688 | 0.0022 | 2.2 | 1.7 | 66.1 |

EXAMPLE II

The same electrochemical cell as was utilized in Example I was assembled, except that the high surface area cathode was made from 316L stainless steel felt which was compressed to the depth of the cathode compartment recess.

The attached Table IV gives the results of a series of runs under Test set 1 that demonstrates the direct reduction of dilute sodium chlorite dissolved in deionized water and processed in a single pass through flow method. A dilute 102 ppm sodium chlorite solution was processed at three different ampere settings at mass flow rates of 53 gm/min for settings of 2.0 amperes, 0.50 amperes and 0.25 amperes. The 2.0 ampere settings produced about a 78% reduction to about 22–23 ppm at 15% current efficiency. At the lower 0.50 ampere setting, the chlorite concentration in the product solution increased to about 34 ppm, but with a much higher current efficiency of about 51.5%. Lowering the applied current further to about 0.25 amperes increased the chlorite in the product to about 42–43 ppm, but at a higher current efficiency of about 88.9–90.8%.

Lowering the flow rate to about 26.5 gm/min at an applied current of about 0.50 amperes, the chlorite in the product solution was reduced substantially to about 17–19 ppm at a current efficiency of about 31.3–31.5%.

The attached Table V gives the results of three runs made in the same cell with very dilute sodium chlorite dissolved in deionized water and processed in a single pass through flow method. About 8.8 ppm sodium chlorite solution was processed with a constant flow rate of about 53 gm/min at ampere settings of about 0.10, 0.50 and 1.00 amperes.

At an applied current of about 0.5 amperes, the sodium chlorite solution was reduced by about 90.4–90.6% to about 0.8 ppm at a current efficiency of about 6%. At the lower applied current setting of about 0.10 amperes, the chlorite concentration in the product increased to about 1.5 ppm, but with a higher current efficiency of about 27%. Raising the applied current setting to about 1.0 amperes, the sodium chlorite concentration in the product solution was substantially reduced to no detectable amount, with an analysis detection limit of about 0.5 ppm.

This Example shows the higher efficiency of the stainless steel felt over the graphite felt.

TABLE IV

ELECTROCHEMICAL REDUCTION OF AQUEOUS DILUTE SOLUTIONS OF CHLORITE IN A SINGLE PASS ELECTROCHEMICAL CELL
CATHODE: Stainless 316L Felt

| TIME | FEED FLOW-RATE (gm/min) | CELL OPERATION AMPS | CELL OPERATION VOLTS | PRODUCT pH | PRODUCT SOLUTION TITRATION ml | PRODUCT SOLUTION TITRATION gm Sample | PRODUCT SOLUTION COMPOSITION gm/l as NaClO2 | PRODUCT SOLUTION COMPOSITION ppm as NaClO2 | CELL CURRENT EFFICIENCY % | NaClO2 REDUCTION % |
|---|---|---|---|---|---|---|---|---|---|---|
| TEST SET #1: Sodium Chlorite in Deionized Water Solution - Dilute Solution | | | | | | | | | | |
| FEED COMPOSITION → | | | | 8.67 | 2.70 | 60.004 | 0.102 | 102 | | |
| 2:50 | 53.0 | 2.00 | ← Cell Start-up | | | | | | | |
| 3:05 | 53.0 | 2.00 | 3.03 | 10.03 | 0.60 | 60.575 | 0.022 | 22 | 15.0 | 78.0 |
| 3:15 | 53.0 | 2.00 | 3.03 | 10.030 | 0.60 | 60.012 | 0.023 | 23 | 15.0 | 77.8 |
| 3:15 | 53.0 | 0.50 | ← Change in Current | | | | | | | |
| 3:20 | 53.0 | 0.50 | 2.57 | 6.58 | 0.90 | 60.450 | 0.034 | 34 | 51.5 | 66.9 |
| 3:25 | 53.0 | 0.50 | 2.57 | 6.27 | 0.90 | 60.138 | 0.034 | 34 | 51.4 | 66.7 |
| 3:25 | 53.0 | 0.25 | ← Change in Current | | | | | | | |
| 3:37 | 53.0 | 0.25 | 2.34 | 4.48 | 1.13 | 61.147 | 0.042 | 42 | 90.8 | 58.9 |
| 3:45 | 53.0 | 0.25 | 2.34 | 4.70 | 1.17 | 61.513 | 0.043 | 43 | 88.9 | 57.7 |
| 3:45 | 26.5 | 0.50 | ← Change in Current & Flowrate | | | | | | | |
| 3:55 | 26.5 | 0.50 | 2.65 | 9.21 | 0.50 | 60.720 | 0.019 | 19 | 31.5 | 81.7 |

TABLE IV-continued

ELECTROCHEMICAL REDUCTION OF AQUEOUS DILUTE SOLUTIONS OF CHLORITE
IN A SINGLE PASS ELECTROCHEMICAL CELL
CATHODE: Stainless 316L Felt

| TIME | FEED FLOW-RATE (gm/min) | CELL OPERATION AMPS | VOLTS | PRODUCT pH | PRODUCT SOLU-TION TITRATION ml | gm Sample | PRODUCT SOLU-TION COMPOSITION gm/l as NaClO2 | ppm as NaClO2 | CELL CURRENT EFFICIENCY % | NaClO2 REDUC-TION % |
|---|---|---|---|---|---|---|---|---|---|---|
| 4:10 | 26.5 | 0.50 | 2.60 | 9.33 | 0.45 | 61.036 | 0.017 | 17 | 32.2 | 83.6 |

TABLE V

ELECTROCHEMICAL REDUCTION OF AQUEOUS DILUTE SOLUTIONS OF CHLORITE
IN A SINGLE PASS ELECTROCHEMICAL CELL
CATHODE: Stainless 316L Felt

| TIME | FEED FLOW-RATE (gm/min) | CELL OPERATION AMPS | VOLTS | PRODUCT pH | PRODUCT SOLU-TION TITRATION ml | gm Sample | PRODUCT SOLU-TION COMPOSITION gm/l as NaClO2 | ppm as NaClO2 | CELL CURRENT EFFICIENCY % | NaClO2 REDUC-TION % |
|---|---|---|---|---|---|---|---|---|---|---|
| TEST SET #1: Sodium Chlorite in Deionized Water Solution - Dilute Solution | | | | | | | | | | |
| FEED COMPOSITION → | | | | 4.75 | 0.315 | 81.644 | 0.0088 | 8.8 | | |
| 4:05 | 53.0 | 0.50 | ← Cell Start-up | | | | | | | |
| 4:20 | 53.0 | 0.50 | 2.83 | 8.52 | 0.030 | 80.625 | 0.0008 | 0.8 | 6.0 | 90.4 |
| 4:25 | 53.0 | 0.50 | 2.83 | 8.60 | 0.030 | 82.306 | 0.0008 | 0.8 | 6.0 | 90.6 |
| 4:25 | 53.0 | 1.00 | ← Change in Current | | | | | | | |
| 4:35 | 53.0 | 1.00 | 2.57 | 9.10 | 0.000 | 60.450 | 0.0000 | 0.0 | 3.3 | 100.0 |
| 4:40 | 53.0 | 1.00 | 2.57 | 9.08 | 0.000 | 60.138 | 0.0000 | 0.0 | 3.3 | 100.0 |
| 4:40 | 53.0 | 0.10 | ← Change in Current | | | | | | | |
| 3:45 | 53.0 | 0.10 | 2.43 | 6.20 | 0.040 | 61.147 | 0.0015 | 1.5 | 27.4 | 83.0 |
| 4:55 | 53.0 | 0.10 | 2.43 | 6.18 | 0.040 | 61.513 | 0.0015 | 1.5 | 27.5 | 83.1 |

The scope of the intended claims is intended to encompass all obvious changes in the details, materials, and arrangements of parts, which will occur to one of skill in the art upon a reading of the disclosure. For example, while the reduction has primarily been described as occurring in an aqueous feed solution that is reduced in a single pass through the cell 10, it is possible to recycle the feed solution multiple times to increase the desired reduction, as was done in Test set 3 of Example I in the data presented in Table I. It is also possible to add salts, such as anions of chlorides, sulfates, phosphates or carbonates, to the feed solution to increase the efficiency of the high surface area cathodes.

Having thus described the invention, what is claimed is:

1. A process for electrochemically treating an aqueous solution containing inorganic oxyhalide species, comprising the steps of:
   (a) positioning a separator between an anode and a cathode and directly against at least the cathode in an electrochemical reduction cell to thereby separate a catholyte compartment from an anolyte compartment;
   (b) feeding the aqueous solution into the catholyte compartment of the electrochemical reduction cell so that the only flow direction through the catholyte compartment is parallel to the separator and normal to electrical current flow;
   (c) utilizing a high surface area, high hydrogen overvoltage cathode to electrochemically reduce substantially all of the oxyhalide species in the aqueous solution in the catholyte compartment to halide ions to produce a purified product of water having halide ions, hydrogen gas if any, and a lesser quantity of oxyhalide species; and
   (d) separating any hydrogen gas from the product stream.

2. The process according to claim 1 further comprising feeding aqueous solutions having low concentrations of oxyhalides to the catholyte compartment 3. The process according to claim 1 further comprising feeding an aqueous solution having a pH of between about 2 and about 13 to the catholyte compartment.

4. The process according to claim 3 further comprising feeding an aqueous solution having the oxychlorine species selected from the group consisting of hypochlorous acid, chlorine dioxide, chlorites, chlorates and perchlorates to the catholyte compartment.

5. The process according to claim 3 further comprising removing trace transition metal ions from the aqueous solution by depositing them on the high surface area cathode.

6. The process according to claim 5 further comprising periodically acid treating the cathode to remove built up deposits of the trace transition metals and any alkaline earth salt deposits.

7. The process according to claim 3 further comprising using an anode that is placed against the separator.

8. The process according to claim 4 further comprising first treating the aqueous solution with chlorine dioxide as part of a potable water treatment process prior to feeding the aqueous solution into the electrochemical reduction cell.

9. The process according to claim 4 further comprising treating the aqueous solution as part of a waste water treatment process that has been treated with chlorine dioxide to remove unreacted and by-product chlorate and chlorite byproduct prior to feeding the aqueous solution into the electrochemical reduction cell.

10. The process according to claim 1 further comprising electrochemically reducing substantially all of the oxyhalide species in the catholyte compartment to the halide ion to produce a purified product of water having less than 30 parts per million oxyhalide species.

11. The process according to claim 10 further comprising electrochemically reducing substantially all of the oxyhalide species in the catholyte compartment to the halide ion to produce a purified product of water having less than 0.5 parts per million oxyhalide species.

12. The process according to claim 1 further comprising feeding a dilute electrolyte selected from the group consisting of deionized water, softened water and non-oxidizable acids to the anolyte compartment.

13. The process according to claim 12 further comprising electrochemically oxidizing the dilute electrolyte in the anolyte compartment to produce oxygen.

14. The process according to claim 11 further comprising using a cation exchange membrane as the separator.

15. The process according to claim 1 further comprising using a diaphragm as the separator.

16. A process for electrochemically treating an aqueous solution containing inorganic oxyhalide species, comprising the steps of:
    (a) positioning a separator between an anode and a cathode and directly against at least the cathode in an electrochemical reduction cell to thereby separate a catholyte compartment from an anolyte compartment;
    (b) feeding the aqueous solution into the catholyte compartment of the electrochemical reduction cell so that the only flow direction through the catholyte compartment is parallel to the separator and normal to electrical current flow;
    (c) utilizing a high surface area cathode to electrochemically reduce at high efficiency substantially all of the oxyhalide species in the aqueous solution in the catholyte compartment to the halide ion to produce a purified water product having halide ions, hydrogen gas if any, and residual oxyhalide species, the high efficiency reduction being characterized by having a current efficiency and an oxyhalide removal efficiency whose sum is greater than 50%; and
    (d) separating any hydrogen gas from the product stream.

17. The process according to claim 16 further comprising feeding a dilute electrolyte selected from the group consisting of deionized water, softened water and non-oxidizable acids to the anolyte compartment.

18. The process according to claim 17 further comprising electrochemically oxidizing the dilute electrolyte in the anolyte compartment to produce oxygen.

19. The process according to claim 18 further comprising feeding aqueous solutions having low concentrations of oxyhalides to the catholyte compartment.

20. The process according to claim 19 further comprising feeding an aqueous solution having a pH of between about 2 and about 13 to the catholyte compartment.

21. The process according to claim 20 further comprising feeding an aqueous solution having the oxychlorine species selected from the group consisting of hypochlorous acid, chlorine dioxide, chlorites, chlorates and perchlorates to the catholyte compartment.

22. The process according to claim 21 further comprising first treating the aqueous solution with chlorine dioxide as part of a potable water treatment process prior to feeding the aqueous solution into the electrochemical reduction cell.

23. The process according to claim 21 further comprising treating the aqueous solution as part of a waste water treatment process that has been treated with chlorine dioxide to remove unreacted and byproduct chlorate and chlorite by-product prior to feeding the aqueous solution into the electrochemical reduction cell.

24. The process according to claim 22 further comprising electrochemically reducing substantially all of the oxyhalide species in the catholyte compartment to the halide ion to produce a purified product of water having less than 30 parts per million oxyhalide species.

25. The process according to claim 24 further comprising electrochemically reducing substantially all of the oxyhalide species in the catholyte compartment to the halide ion to produce a purified product of water having less than 0.5 parts per million oxyhalide species.

26. The process according to claim 25 further comprising using a cation exchange membrane as the separator.

27. The process according to claim 25 further comprising using a diaphragm as the separator.

28. A process for electrochemically treating an aqueous solution containing inorganic oxyhalide species, comprising the steps of:
    (a) feeding the aqueous solution into a catholyte compartment of an electrochemical reduction cell having a separator separating a cathode in the catholyte compartment from an anode in an anolyte compartment so that the aqueous solution substantially only flows lengthwise through the cathode and normal to the electrical current flow;
    (b) utilizing a high surface area cathode to electrochemically reduce at high efficiency substantially all of the oxyhalide species in the aqueous solution in the catholyte compartment to the halide ion to produce a purified water product having halide ions, hydrogen gas if any, and residual oxyhalide species, the high efficiency reduction being characterized by having a current efficiency and an oxyhalide removal efficiency whose sum is greater than 50%; and
    (c) separating any hydrogen gas from the product stream.

29. The process according to claim 28 further comprising feeding an aqueous solution having oxychlorine species selected from the group consisting of hypochlorous acid, chlorine dioxide, chlorites, chlorates and perchlorates to the catholyte compartment.

30. The process according to claim 29 further comprising feeding a dilute electrolyte selected from the group consisting of deionized water, softened water and non-oxidizable acids to the anolyte compartment.

* * * * *